US009424200B2

(12) United States Patent
Tkacik et al.

(10) Patent No.: US 9,424,200 B2
(45) Date of Patent: Aug. 23, 2016

(54) CONTINUOUS RUN-TIME INTEGRITY CHECKING FOR VIRTUAL MEMORY

(71) Applicants: Thomas E. Tkacik, Phoenix, AZ (US); Matthew W. Brocker, Gilbert, AZ (US); Carlin R. Covey, Tempe, AZ (US)

(72) Inventors: Thomas E. Tkacik, Phoenix, AZ (US); Matthew W. Brocker, Gilbert, AZ (US); Carlin R. Covey, Tempe, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 192 days.

(21) Appl. No.: 13/842,516

(22) Filed: Mar. 15, 2013

(65) Prior Publication Data

US 2014/0281354 A1 Sep. 18, 2014

(51) Int. Cl.
*G06F 12/00* (2006.01)
*G06F 12/10* (2016.01)
*G06F 21/57* (2013.01)
*G06F 21/64* (2013.01)

(52) U.S. Cl.
CPC ........... *G06F 12/1009* (2013.01); *G06F 21/57* (2013.01); *G06F 21/64* (2013.01)

(58) Field of Classification Search
None
See application file for complete search history.

(56) References Cited

U.S. PATENT DOCUMENTS

| | | |
|---|---|---|
| 6,640,294 B2 | 10/2003 | Debiez et al. |
| 7,103,779 B2 | 9/2006 | Kiehtreiber et al. |
| 7,257,712 B2 | 8/2007 | Hughes et al. |
| 7,401,234 B2 | 7/2008 | Case et al. |
| 7,739,517 B2 | 6/2010 | Sahita et al. |
| 7,962,738 B2 | 6/2011 | Zimmer et al. |
| 8,051,299 B2 | 11/2011 | Saunier |

*Primary Examiner* — Midys Rojas
(74) *Attorney, Agent, or Firm* — Sherry W. Schumm (57) ABSTRACT

A run-time integrity checking (RTIC) method compatible with memory having at least portions that store data that is changed over time or at least portions configured as virtual memory is provided. For example, the method may comprise storing a table of page entries and accessing the table of page entries by, as an example, an operating system or, as another example, a hypervisor to perform RTIC on memory in which, as an example, an operating system, as another example, a hypervisor, or, as yet another example, application software is stored. The table may, for example, be stored in secure memory or in external memory. The page entry comprises a hash value for the page and a hash valid indicator indicating the validity status of the hash value. The page entry may further comprise a residency indicator indicating a residency status of the memory page.

18 Claims, 5 Drawing Sheets

CONTINUOUS RUN-TIME INTEGRITY CHECKING FOR VIRTUAL MEMORY

BACKGROUND

1. Field of the Disclosure

This disclosure relates generally to security of an information processing system and, more specifically, to integrity checking in an information processing system.

2. Description of the Related Art

Run-time integrity checking (RTIC) provides a security feature where the contents of memory are checked at load time, and then periodically re-checked later to verify that the contents have not changed. However, while some uses of memory, such as a program image, may be static (i.e., not changing over time), other uses of memory may involve changing data, such as stack memory or heap, where such changes are normal and do not indicate a memory integrity problem. Thus, RTIC can yield a false error result when normally changing data is stored in the memory being checked. This type of constantly changing data is not a good candidate for conventional methods of performing run-time integrity checking. Also, changes to memory may occur normally, for example, under an operating system providing virtual memory, in which memory pages are swapped into physical memory when their data are to be accessed and may be swapped out of physical memory into storage, such as on a hard disk drive, when their data do not need to be accessed immediately (where physical memory, as used herein, refers to the main randomly accessible memory of a processing system or a view of that main randomly accessible memory as presented by a cache memory system). If RTIC attempts to check physical memory used for paging of virtual memory, it may find a different virtual memory page swapped into physical memory where a previously resident virtual memory page had been and may indicate that the contents of memory have changed even when the respective virtual memory pages remain unchanged and have merely been swapped in and out of physical memory under the normal operation of the virtual memory system.

Run-time integrity checking is accomplished by generating a hash value over a block of memory and retaining that hash value as a reference hash. Such a hash value may be obtained from a hash function. A hash function mathematically generates a small amount of information (i.e., the hash value) from a large amount of information (e.g., the contents of the block of memory on which the hash function is being performed) in a manner that makes it unlikely that changes, even deliberate changes, to the large amount of information will result in the hash value remaining unchanged. Periodically, a new hash value is generated over the same block of memory, and the new hash value is compared with the reference hash value. If the two hash values are identical, then the memory contents have not changed since the reference hash was generated. A difference between the two hash values indicates that the memory contents have changed. This is typically taken to mean memory corruption, and an error indication is generated (e.g., an interrupt or hardware failure indicator). Calculation of a hash value may also be used to provide secure boot functionality, where the calculated hash value may be compared against a stored hash value of a boot software image to assure that the boot software image has not been altered. However, incompatibility of the hash value used for the RTIC and the hash value used for the secure boot operation, as well as the false error indications that may result from comparison of hash values when data have changed or when virtual memory paging operations have occurred impair the use of such hash values in many situations.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A run-time integrity checking (RTIC) method compatible with memory having at least portions that store data that is changed over time or at least portions configured as virtual memory is provided. For example, the method may comprise storing a table of page entries and accessing the table of page entries by, as an example, an operating system or, as another example, a hypervisor to perform run-time integrity checking on the contents of memory in which, as an example, an operating system, as another example, a hypervisor, or, as yet another example, application software is stored. A page entry of the page entries corresponds to a memory page of a plurality of memory pages into which the memory is organized. The page entry comprises a hash value of the contents of the memory page and a hash valid indicator indicating the validity status of the hash value. The page entry may further comprise a residency indicator indicating whether or not the memory page is currently resident in physical memory. The method may further comprise inhibiting writing the hash value to the page entry of the table in response to the hash valid indicator indicating that the hash value is valid. The method may further comprise calculating a hash value of the current contents of a memory page and comparing that hash value with a reference hash value stored in the page entry for that memory page. The method may further comprise calculating an overall hash value from a plurality of memory page hash values corresponding to the plurality of memory pages. The method may alternatively further comprise calculating a chained overall hash value progressively dependent on preceding memory page hash values corresponding to preceding ones of the plurality of memory pages. The overall hash value may be used for secure boot or secure application loading.

In accordance with at least one embodiment, a RTIC system keeps a table for storing a page entry for each memory page, wherein a page entry includes a hash value calculated from data stored in the memory page. The table is stored, for example, in secure or external memory. Secure memory is memory that is not accessible to the software that is being checked. Secure memory may be a physically secure memory, not accessible to the processor core. In an alternate embodiment, secure memory may be physical memory under control of a memory management unit (MMU), and thus not accessible to a guest operating system or application software that is being checked. Each page entry has a hash valid bit, a hash value, and, in accordance with at least one embodiment, a resident bit. A page-based RTIC technique may be used, for example, by an operating system checking itself, as another example, by an operating system to check applications running under the operating system, as another example, by a hypervisor checking an operating system running under the hypervisor, or, as yet another example, by a hypervisor checking itself.

A page-based RTIC system provides an ability to check not only a base portion of an operating system, which may be contiguous in physical memory, but also memory contents that may not be present at boot time, and that may be swapped into and out of physical memory as virtual memory pages. An example of such memory contents is application software instruction code, which may be loaded after boot time, and which may be swapped into and out of physical memory under the control of an operating system that uses virtual memory. A page-based RTIC system may be capable of dealing with large amounts of scattered data, some of which is to be checked and some of which may be excluded from RTIC operations, and also selectively turning off checking, which may be used to exclude portions of memory from RTIC operations. As an example, changing data which changes during normal operation of a processing system may be excluded from RTIC operations to prevent false error (e.g., undesired mismatch) indications. As another example, some data may be swapped out to disk, and checking should be put on hold for portions of memory used to store such data. By being able to selectively enable and disable RTIC operations for each of many different memory pages, which may, for example, be 4 Kbyte memory pages, many different types of program instruction code, which may be diversely located within memory space, may be efficiently checked using RTIC. Page-based RTIC may be applied not only to system software, such as a boot code image, hypervisor instruction code, and operating system instruction code, but also to other types of program instruction code, such as application software. In some examples, the memory contents to be checked using RTIC may be loaded at some time during operation of an information processing system after boot time, and the motivation for checking such memory contents may end at some point thereafter, for example, when the execution of application software instruction code ends. If there are multiple operating systems (OSes) each using different virtual address spaces, checking using RTIC may be performed in those different virtual address spaces.

Hash value generation may be used to provide secure boot functionality (and/or secure application loading) and to provide run-time integrity checking. In the context of a secure boot operation, hash value generation may be used to verify a digital signature, for example, to allow authentication of a boot code image. In secure application loading, the operating system may verify a digital signature on a trusted application program before loading and executing the trusted application program. In the context of run-time integrity checking, hash value generation may be used to obtain hash values for individual memory page validation.

With a virtualized RTIC method, there may be a hash value for each block (e.g., each 4K page) rather than a single hash over the entire application program. If a secure boot method generates a single hash over the entire application program without regard to the specific portions of the application program stored in specific memory blocks, then generating per-block hash values for memory validation may involve performing hash calculations for the application program a second time (after first hashing the entire application program for the benefit of the secure boot method). Such duplication of effort and inefficiency can be avoided by a method for generating hash values adequate to pertain to an entire application program (for use, e.g., with secure boot) and for also creating, without the need for performing another set of calculations on the memory contents in which the application program is stored, individual hash values for each block (for use, e.g., with run-time integrity checking), according to various embodiments. Such a method may be used to create both a hash value for use with secure boot (and/or secure application loading) and a hash value for each memory block within which the application program is stored with a single pass over the application program to calculate both types of hash value. Since a secure boot operation, if performed, is likely to be performed prior to run-time integrity checking being initiated, providing a single-pass method for generating a hash value for secure boot and hash values for RTIC allows already computed hash values obtained during the secure boot operation to be used immediately for RTIC, avoiding temporal gaps during which RTIC might otherwise not be able to detect alteration of memory contents.

Figure 1:
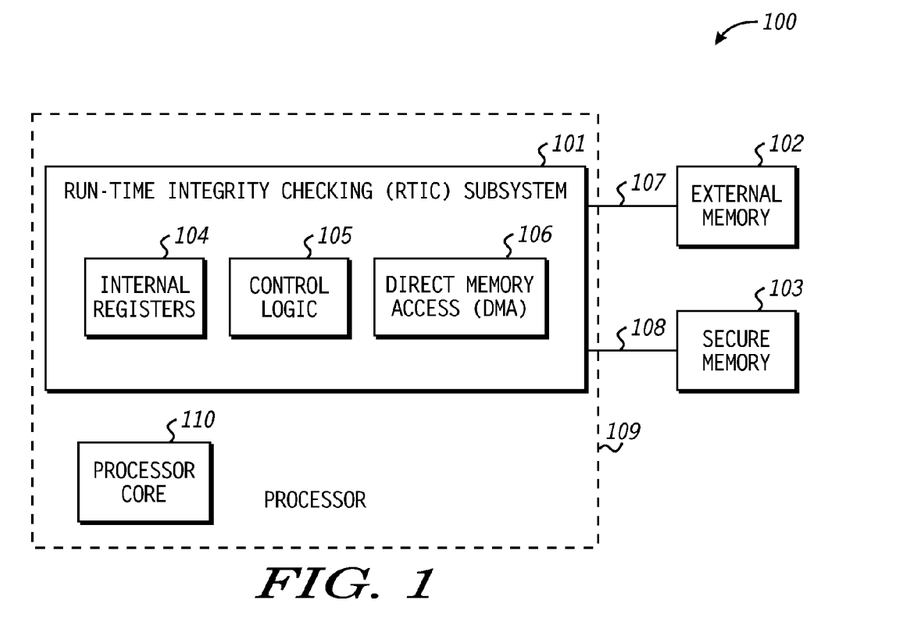
FIG. 1 is a block diagram illustrating an information processing system in accordance with at least one embodiment.

FIG. 1 is a block diagram illustrating an information processing system in accordance with at least one embodiment. Information processing system 100 comprises processor 109, external memory 102, and secure memory 103. Processor 109 comprises processor core 110 and real-time integrity checking (RTIC) system 101. RTIC system 101 comprises internal registers 104, control logic 105, and direct memory access (DMA) block 106. RTIC system 101 is in communication with external memory 102 via connection 107. RTIC system 101 is in communication with secure memory 103 via connection 108.

Figure 2:
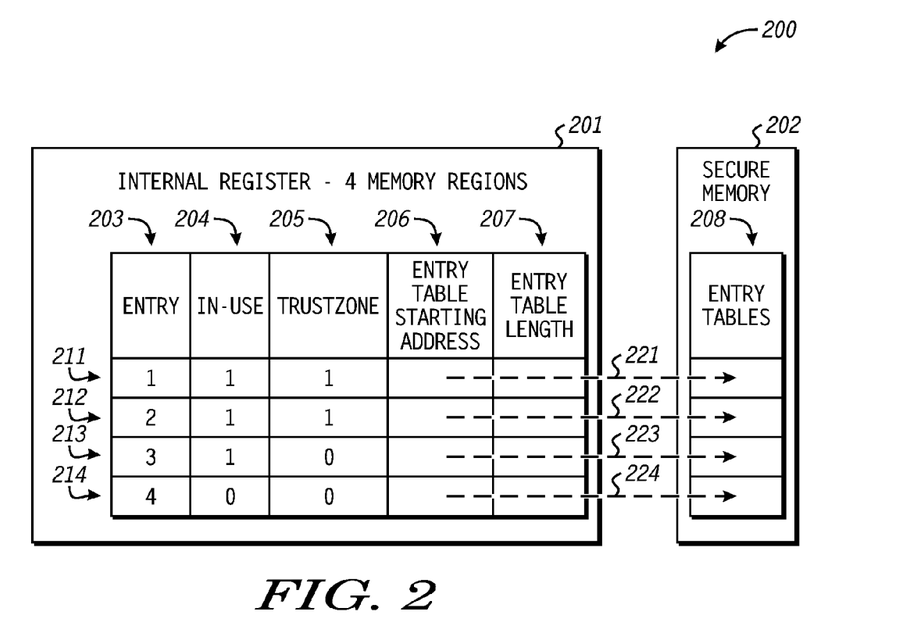
FIG. 2 is a block diagram illustrating a relationship between information stored in an internal register and information stored in secure memory in accordance with at least one embodiment.

FIG. 2 is a block diagram illustrating a relationship between information stored in an internal register and information stored in secure memory in accordance with at least one embodiment. RTIC data structure 200 comprises internal register data set 201 and secure memory data set 202. Internal register data set 201 may be stored, for example, in internal registers, such as internal registers 104 of FIG. 1. Secure memory data set 202 may be stored, for example, in secure memory, such as secure memory 103 of FIG. 1. In the example shown in FIG. 2, internal register data set 201 comprises entries for four memory regions, each of which may correspond, for example, to a software application, operating system (OS), hypervisor, or other software entity to be checked. Other embodiments may have registers comprising fewer or more than four memory regions. The entries are shown under entry column 203 and include entries 211, 212, 213, and 214. An in-use indicator to indicate whether a memory region corresponding to an entry is currently in use, and should be checked by RTIC, is shown under in-use column 204 for each of the entries 211, 212, 213, and 214. In the illustrated example, the in-use indicator is set to binary one for each of entries 211, 212, and 213 and to binary zero for entry 214. A response indicator to indicate what type of response should occur to the detection of a mismatch when comparing a hash value to a stored reference hash value is shown under response column 205 for each of entries 211, 212, 213, and 214. In the illustrated example, the response indicator is one for each of entries 211 and 212 and zero for each of entries 213 and 214. Possible responses to the detection of a mismatch include setting a bit in a status register, generating an interrupt, asserting a hardware error indication signal, or other response. An entry table starting address is shown under entry table starting address column 206 and an entry table length is shown under entry table length column 207 for each entry for which an entry table is provided in secure memory data set 202 indicating the number of page entries that are in the entry table. Arrows 221, 222, and 223 show how the entry table starting addresses function as pointers to point to the starting addresses of the entry tables under entry table column 208 in secure memory data structure 202 for each entry having an entry table in secure memory data structure 202, with arrows 221, 222, and 223 corresponding to entries 211, 212, and 213, respectively. Note that internal register data set 201 may contain additional columns that indicate other information related to each entry. For example, an additional column may contain a value indicating how often the RTIC system should check the hash values of the pages in a particular entry table. As another example, an additional column may indicate a particular hash algorithm (to perform a hash function) or other algorithm (e.g., a non-hash algorithm that produces a relatively small amount of information from a larger amount of information such that the small amount of information would suffice as a hash value in an implementation where the non-hash algorithm is used) that is to be used when computing the hash values for the pages in a particular entry table. If a hash value is to be generated by a hash function performed according to a hash algorithm, examples of such hash algorithms include any algorithm defined in FIPS 180-3 (e.g., SHA-1, SHA-224, SHA-256, SHA-384, SHA-512), any algorithm defined by secure hash standard (FIPS 180-3) (e.g., SHA-3), the MD5 algorithm, any Message Authentication Code (MAC) algorithm, any Keyed Message Authentication Code algorithm, any Cyclic Redundancy Check (CRC) algorithm.

Figure 3:
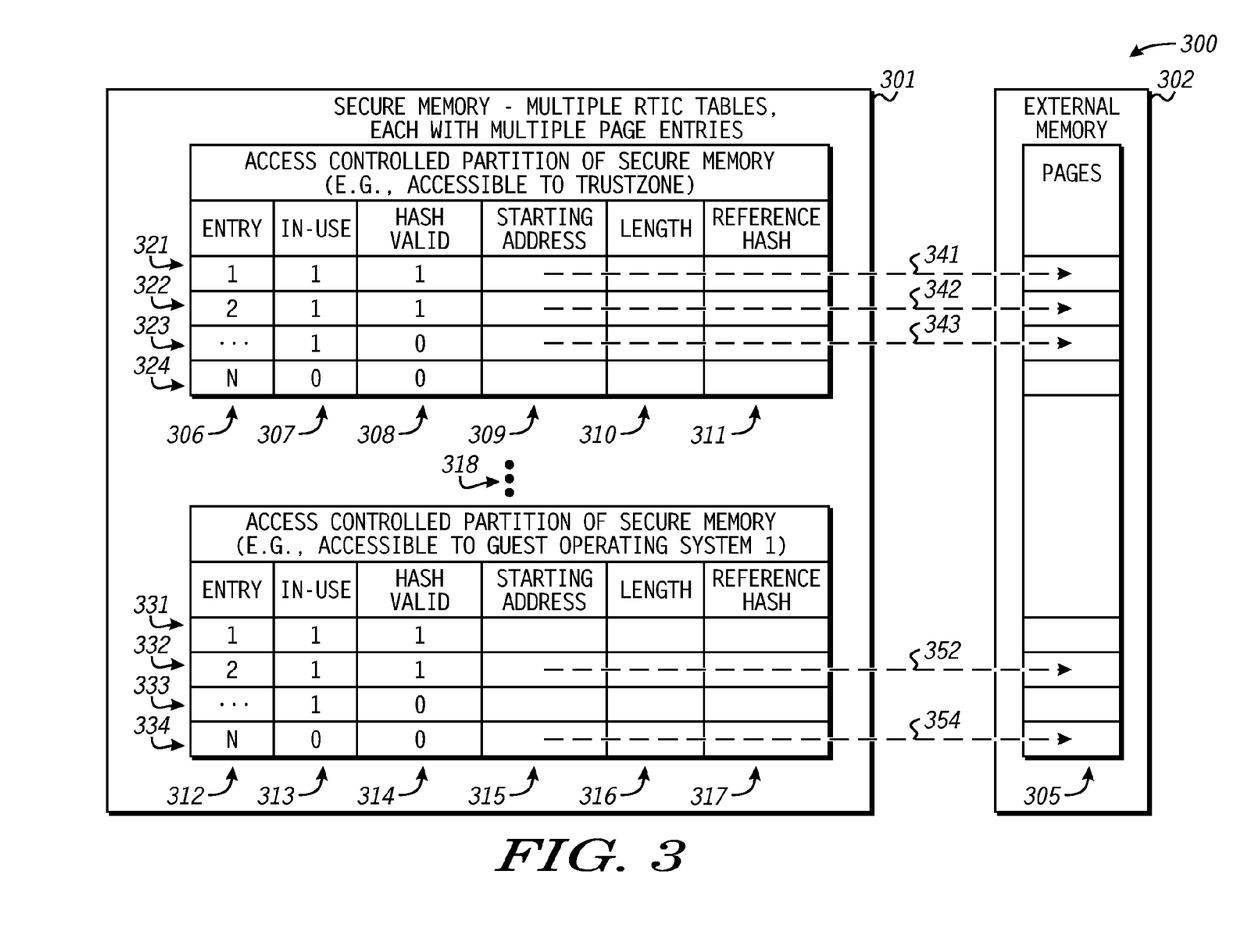
FIG. 3 is a block diagram illustrating a relationship between information stored in secure memory and information stored in external memory in accordance with at least one embodiment.

FIG. 3 is a block diagram illustrating a relationship between information stored in secure memory and information stored in external memory in accordance with at least one embodiment. RTIC data structure 300 comprises secure memory data set 301 and external memory data set 302. RTIC data structure 300 includes multiple RTIC tables, each with multiple page entries. In the illustrated example, secure memory data set 301 comprises table 303 for an access controlled partition of secure memory, which may, for example, be accessible to a hypervisor, and table 304 for an access controlled partition of secure memory, which may, for example, be accessible to a guest operating system.

Table 303 comprises entries 321, 322, 323, and 324, for which the ellipsis of entry 323 and the N of entry 324 indicate such entries may represent any number of entries, as shown under entry column 306. An enable indicator to indicate whether RTIC is enabled for a memory region corresponding to an entry is shown under enable column 307 for each of the entries 321, 322, 323, and 324. As enabling and disabling of RTIC for a memory region may be conditioned, for example, upon a state of a residency indicator (i.e., an indicator of whether the corresponding memory page is resident in physical memory or not), a residency indicator may be considered to be an example of the enable indicator (e.g., an enable bit). In the illustrated example, the enable indicator is set to binary one for each of entries 321, 322, and 323 and to binary zero for entry 324. A hash valid indicator to indicate whether a reference hash value for a memory page corresponding to an entry is or is not valid is shown under hash valid column 308 for each of entries 321, 322, 323, and 324. A reference hash indicated by a hash valid indicator to be invalid may have any value, even a value not generated by a hash function (e.g., when the contents of a hash valid indicator of a entry may be in an unknown state before a first hash value is stored as a hash valid indicator of the entry). In the illustrated example, the hash valid indicator is binary one for each of entries 321 and 322 and binary zero for each of entries 323 and 324. A memory page starting address is shown under starting address column 309 and a memory page length is shown under length column 310 for each entry for which a memory page is provided in external memory data set 302. A reference hash value is shown under reference hash column 311 for each entry for which a memory page is provided in external memory data set 302. The reference hash value for a memory page includes the hash value of the contents of the memory page at the time the contents were first loaded into the memory page. Arrows 341, 342, and 343 show how the memory page starting addresses function as pointers to point to the starting addresses of the memory pages under pages column 305 in external memory data structure 302 for each entry having a memory page in external memory data structure 302, with arrows 341, 342, and 343 corresponding to entries 321, 322, and 323, respectively. Ellipsis 318 indicates any number of RTIC tables may be provided in secure memory data set 301.

Table 304 comprises entries 331, 332, 333, and 334, for which the ellipsis of entry 333 and the N of entry 334 indicate such entries may represent any number of entries, as shown under entry column 312. Table 303 may represent one application of run-time integrity checking, such as for a hypervisor checking the software code of an operating system, while table 304 may represent a different application of run-time integrity checking, such as the operating system checking the software code of an application program. Multiple uses of run-time integrity checking may occur simultaneously, under control of different control software (e.g., a hypervisor or operating system). An enable indicator to indicate whether RTIC is enabled for a memory region corresponding to an entry is in use is shown under enable column 313 for each of the entries 331, 332, 333, and 334. In the illustrated example, the enable indicator is set to binary one for each of entries 332 and 334 and to binary zero for each of entries 331 and 333. A hash valid indicator to indicate whether a hash value for a memory page corresponding to an entry is or is not valid is shown under hash valid column 314 for each of entries 331, 332, 333, and 334. In the illustrated example, the hash valid indicator is binary one for each of entries 332 and 333 and binary zero for each of entries 331 and 334. A memory page starting address is shown under starting address column 315 and a memory page length is shown under length column 316 for each entry for which a memory page is provided in external memory data set 302. A reference hash value is shown under reference hash column 317 for each entry for which a memory page is provided in external memory data set 302. Arrows 352 and 354 show how the memory page starting addresses function as pointers to point to the starting addresses of the memory pages under pages column 305 in external memory data structure 302 for each entry having a memory page in external memory data structure 302, with arrows 352 and 354 corresponding to entries 332 and 334, respectively.

Figure 4:
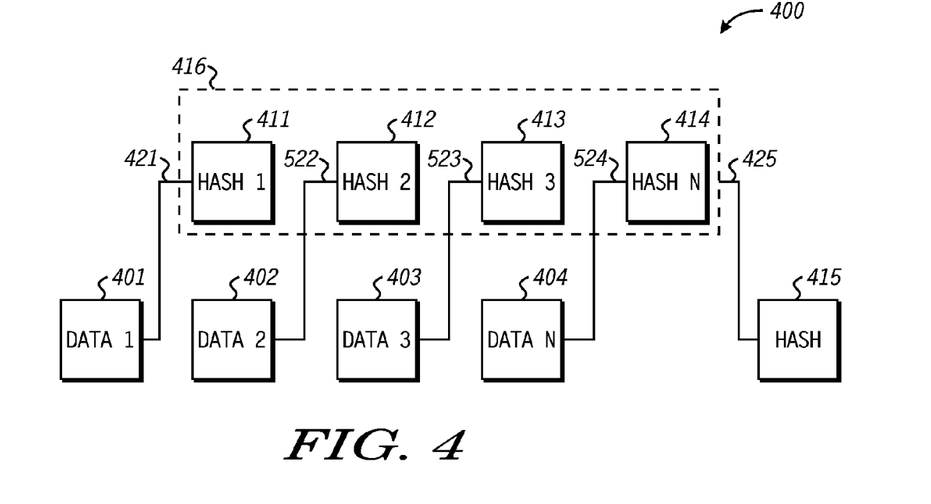
FIG. 4 is a block diagram illustrating a data structure wherein a hash of hashes for individual data blocks is generated in accordance with at least one embodiment.

FIG. 4 is a block diagram illustrating a data structure wherein a hash of hashes for individual data blocks is generated in accordance with at least one embodiment. Hash generation data structure 400 comprises data page 401, data page 402, data page 403, data page 404, data page hash value 411, data page hash value 412, data page hash value 413, data page hash value 414, and overall hash value 415. Although four data pages 401-404 and data page hashes 411-414 are shown, there may be any number of data pages and data page hash values in the hash generation data structure 400. As illustrated by connection 421, data page hash value 411 is calculated from the contents of data page 401. As illustrated by connection 422, data page hash value 412 is calculated from the contents of data page 402. As illustrated by connection 423, data page hash value 413 is calculated from the contents of data page 403. As illustrated by connection 424, data page hash value 414 is calculated from the contents of data page 404. As illustrated by block 416 around data page hash values 411-414 and by connection 425, overall hash value 415 is calculated from a combination (e.g., a concatenation) of data page hash values 411-414. Thus, overall hash value 415 may be said to be a hash of hashes. The hash of hashes 415 may be used during secure boot to validate a boot software image, and/or during secure application loading to validate a trusted application program. Each individual hash 411-414 may be used as a respective one of the entry table reference hashes under reference hash columns 311, 317.

Figure 5:
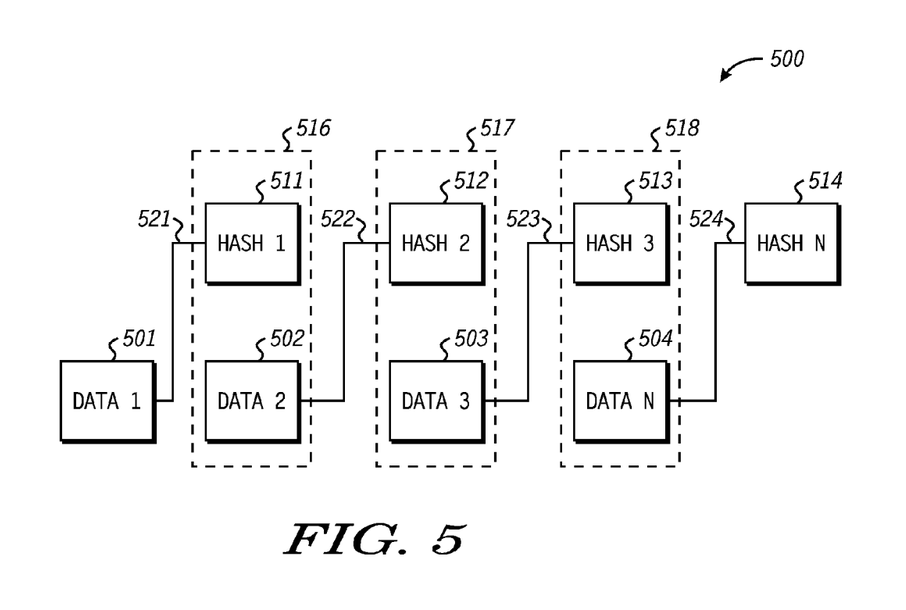
FIG. 5 is a block diagram illustrating a data structure wherein a hash-chaining of hashes for individual data blocks is used to generate a hash in accordance with at least one embodiment.

FIG. 5 is a block diagram illustrating a data structure wherein a hash-chaining of hashes for individual data blocks is used to generate a hash in accordance with at least one embodiment. Hash generation data structure 500 comprises data page 501, data page 502, data page 503, data page 504, data page hash value 511, chained data page hash value 512, chained data page hash value 513, and chained overall hash value 514. Although four data pages 501-504 and four data page hash values 511-514 as shown, there may be any number of data pages and data page hash values in the hash generation data structure 500. As illustrated by connection 521, data page hash value 511 is calculated from the contents of data page 501. As illustrated by block 516 around data page 502 and data page hash value 511 and by connection 522, chained data page hash value 512 is calculated from a combination (e.g., a concatenation) of data page hash value 511 and the contents of data page 502. As illustrated by block 517 around data page 503 and chained data page hash value 512 and by connection 523, chained data page hash value 513 is calculated from a combination (e.g., a concatenation) of chained data page hash value 512 and the contents of data page 503. As illustrated by block 518 around data page 504 and chained data page hash value 513 and by connection 524, chained overall hash value 514 is calculated from a combination (e.g., a concatenation) of chained data page hash value 513 and the contents of data page 504. There may be any number of chained data page hash values 511-514 in the hash generation data structure 500. The final chained data page hash value 514 may be used during secure boot to validate a boot software image. Each individual hash 511-514 may be used as a respective one of the entry table reference hashes under reference hash columns 311, 317. In this case, when generating a hash over a memory page, the prior reference hash is combined with (e.g., prepended to) the memory page to be checked.

Figure 6:
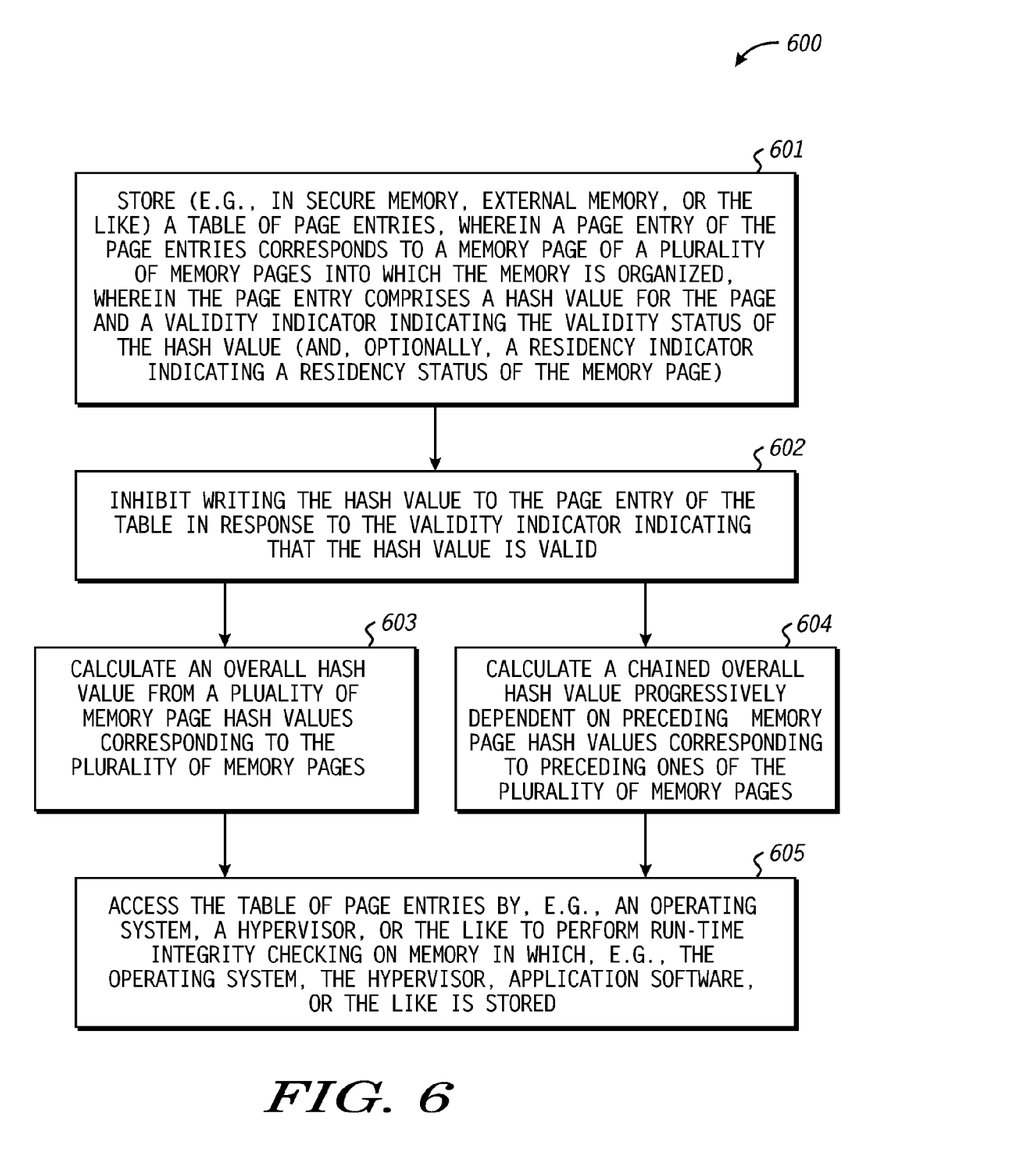
FIG. 6 is a flow diagram illustrating a method in accordance with at least one embodiment.

FIG. 6 is a flow diagram illustrating a method in accordance with at least one embodiment. Method 600 begins in block 601, where a table of page entries is stored (e.g., in secure memory, external memory, or the like). A page entry of the page entries corresponds to a memory page of a plurality of memory pages into which the memory is organized. The page entry comprises a hash value for the page and a hash valid indicator indicating the validity status of the hash value (and, optionally, a residency indicator indicating a residency status of the memory page). From block 601, method 600 continues to block 602. In block 602, the writing of a hash value to a page entry of a table is inhibited in response to the validity indicator indicating that the hash value is already valid. For example, once a valid hash value has been calculated and stored in the table, that hash value can be locked down to prevent it from being altered. From block 602, method 600 may continue to one of blocks 603 and 604, in accordance with at least two embodiments. In block 603, an overall hash value is calculated from a plurality of memory page hash values corresponding to the plurality of memory pages. In block 604, a chained overall hash value progressively dependent on preceding memory page hash values corresponding to preceding ones of the plurality of memory pages is calculated. From either of blocks 603 and 604, method 600 continues to block 605. In block 605, the table of page entries is accessed, (e.g., by an operating system, a hypervisor, or the like) to perform run-time integrity checking on memory in which, e.g., the operating system, the hypervisor, application software, or the like is stored.

Figure 7:
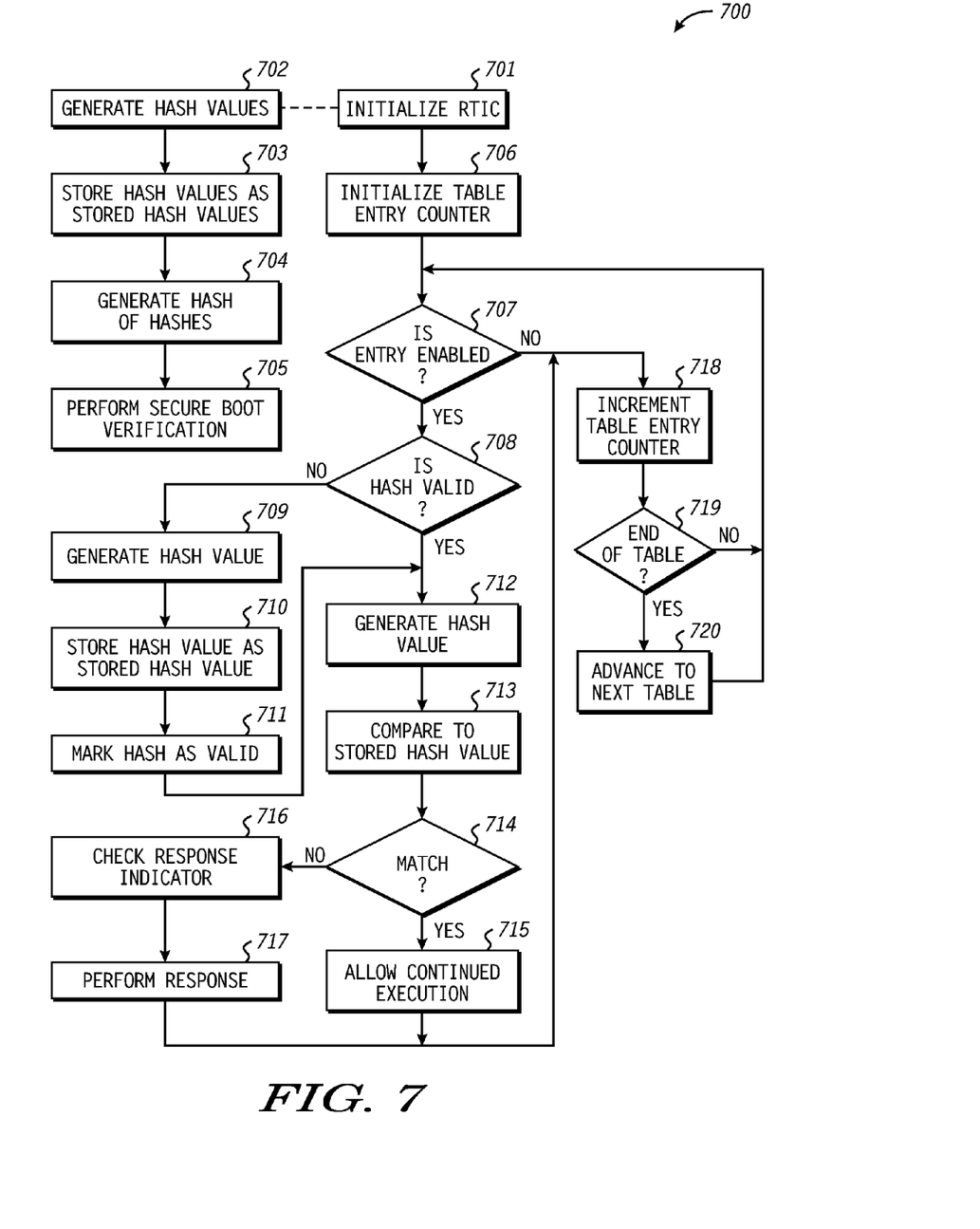
FIG. 7 is a flow diagram illustrating a method in accordance with at least one embodiment.

FIG. 7 is a flow diagram illustrating a method in accordance with at least one embodiment. Method 700 begins in block 701, where an RTIC system is initialized. Such initialization may include, for example, blocks 702-705. In block 702, hash values are generated for memory blocks (e.g., memory pages). From block 702, the method continues to block 703. In block 703, the hash values are stored as stored hash values. From block 703, the method continues to block 704. In block 704, an overall hash value (i.e., a hash of hashes) is generated from the hash values, for example, by concatenating the hash values and calculating the overall hash value for the concatenation of hash values. From block 704, the method continues to block 705. In block 705, secure boot verification is performed, for example, by comparing the overall hash value to a stored overall hash value, which may, for example, be stored in a cryptographically secure manner (e.g., using a digital signature or other public-key-cryptosystem (PKC) authentication technique) with a software boot image. If the overall hash value matches the stored overall hash value, the boot process is allowed to proceed. If not, the boot process may be inhibited.

From block 701, method 700 continues to block 706. In block 706, a table entry counter is initialized. From block 706, method 700 continues to decision block 707. In decision block 707, a decision is made as to whether or not an entry in an entry table is enabled for RTIC, for example, by checking an enable indicator (e.g., an enable bit) in the entry. If not, method 700 continues to block 718, which will be discussed below. If so, method 700 continues to decision block 708. In decision block 708, a decision is made as to whether or not a stored hash value stored with the entry is valid. If so, method 700 continues to block 712, which will be discussed below. If not, method 700 continues to block 709. In block 709, a hash value is generated from the memory block corresponding to the entry. From block 709, method 700 continues to block 710. In block 710, the hash value is stored as a stored hash value in the entry. From block 710, method 700 continues to block 711. In block 711, the stored hash value is marked as valid, for example, by setting a validity indicator (e.g., hash valid indicator) for the hash value in the entry. From block 711, method 700 continues to block 712. Since a hash value for memory block may be unlikely to change in the relatively short time expected to elapse between block 709 and block 712, in accordance with at least one embodiment, method 700 may continue from block 711 to, for example, block 715 or block 718 instead of block 712.

In block 712, a hash value is generated from the memory block corresponding to the entry. From block 712, method 700 continues to block 713. In block 713, the hash value is compared to a stored reference hash value for the memory block corresponding to the entry, which may, for example, be stored in the entry. From block 713, method 700 continues to decision block 714. In decision block 714, a decision is made as to whether or not the hash value matches the stored hash value. If so, method 700 continues to block 715, where execution of the software entity stored in the memory block corresponding to the entry being checked is allowed to continue execution, then to block 718. If not, method 700 continues to block 716. In block 716, a response indicator, which may, for example, be stored in the entry, is checked to determine an appropriate response to a mismatch of the hash value to the stored hash value. From block 716, method 700 continues to block 717. In block 717, a response, for example, the appropriate response determined by response indicator, is performed. Examples of responses include signaling an interrupt to a processor on which method 700 is being performed, signaling an interrupt to a processor on which the software entity stored in the memory block corresponding to the entry being checked is begin executed, activating an alarm signal, disabling sensitive hardware functions, initiating a reset of the system, terminating execution of the software entity stored in the memory block corresponding to the entry being checked, inhibiting access of the software entity stored in the memory block corresponding to the entry being checked to a subset of system resources, and the like. From block 717, method 700 continues to block 718.

In block 718, a table entry counter is incremented, advancing to a next entry of the entry table. From block 718, method 700 continues to decision block 719. In decision block 719, a decision is made as to whether or not an end of the entry table has been reached. If not, method 700 returns to decision block 707. If so, method 700 continues to block 720, where the method advances from the current entry table to a next entry table if a next entry table exists. If the current entry table is a last entry table, the next entry table may be a first entry table, such that the method repeats, going through the entry tables again. From block 720, the method returns to decision block 707.

In accordance with at least one embodiment, rather than having a few registers which store the start address, length and hash value, 64 entries are maintained in a 4K partition of internal physically secure memory. Each entry covers a single 4K block of memory and may include the start address, length, a hash value over that single 4K entry, and valid bits. Each entry may be stopped (i.e., disabled) by setting the enable bit 307, 313 of a entry table entry to zero, when a page is swapped out, or the entirety may be turned off, e.g., when an application is stopped, by setting the in-use bit 204 for a memory region to zero. The secure memory access control features allow many different types of checking, from a hypervisor checking itself, to the hypervisor checking an operating system (OS), to the OS checking an application software program.

The use of many entries for many 4K blocks provides support for virtual memory. Such diversity of entries allows programs to be scattered in physical address space. Rather than being limited to a single reference hash value for an entire program, each 4 k entry gets its own reference hash value. Individual entries may be disabled, e.g., if the data of a memory block corresponding to such an individual entry is swapped out of physical memory (and thus such data do not need to be checked until their memory block is restored to physical memory). The data may be swapped out of one physical memory (e.g., RAM) but still be present in another physical memory (e.g., flash memory). Accordingly, selectively granularly enableable RTIC as described herein may be applied to any of several levels of an information storage hierarchy, which may include, for example, level 1 (L1) cache, level 2 (L2) cache, main RAM, secondary RAM, one or more level of non-volatile storage, and the like.

Each entry may have an enable bit and a hash valid bit. The enable bit allows the entry to be disabled to inhibit RTIC, which is useful, for example, for data not currently in physical memory. The hash valid bit may be set to invalid for data that does not yet have a reference hash value. The first time data is hashed, the reference hash is generated, and the hash valid bit may be set to valid.

Using access control features of the RTIC internal configuration registers, secure memory, and the MMU, various types of run-time integrity checking can be accomplished. As examples, continuous checking of an operating system or hypervisor (which may not be able to be turned off until a system reset), checking an OS by the hypervisor (under control of the hypervisor, but not by the OS), or checking of an application by an OS may be performed in accordance with at least one embodiment. As one example, continuous checking may refer to uninterrupted checking, which continues without interruption. As another example, continuous checking may refer to ongoing checking, which continues to be performed during normal operation of a system (e.g., after execution of one or more software applications has begun). Unlike a technique that may perform checking only when data is being loaded into memory, at least one embodiment may continue to check memory blocks repeatedly as long as they remain in physical memory. An embodiment may inhibit checking while such memory blocks are swapped out of physical memory, for example, by a virtual memory system, and may automatically resume checking (and continuing to check, in an ongoing manner) such memory blocks after they are swapped back into physical memory.

When a hash value calculation for an entire software entity (e.g., hypervisor, OS, software application, or the like) cannot be performed in a single temporally contiguous processing step, but instead is performed incrementally over a number of processing steps, the number of bytes included in a single step of a hash calculation may be, for example, the number of bytes in a memory block (e.g., memory page) for which a hash value is stored. Thus, for example, rather than calculating a hash 64 bytes at a time and making only partial progress toward eventual completion of calculation of a hash value, hash value calculation for a memory block (e.g., 4K byte memory page) corresponding to an entry may be performed in a single hash calculation operation. By calculating separate hash values for each of many memory blocks (e.g., memory pages) of a software entity, each succeeding hash value calculation operation may completely calculate a corresponding hash value.

In accordance with at least one embodiment, an RTIC controller with configuration and timing control is provided. An exemplary RTIC system supports several (e.g., four) entries for checked entities, each with registers that are accessible to checking entities (e.g., hypervisor, OS, and the like) corresponding to their respective checked entities. Individual entries for each application may be stored in secure memory, with up to 64 entries in a 4K block of secure memory. The secure memory can be configured to allow, for example, only RTIC access, RTIC and software access, and the like. Access by software may be further controlled by a MMU. Individual entries may be disabled or modified. To support large applications, the entries in a table may be considered as a cache of entries that can be managed by trusted software. The hashing engine and DMA controller in the RTIC system 101 are used by the RTIC method to access the entries and application data.

In accordance with at least one embodiment, hardware may be used to implement at least a portion of an RTIC system and method, wherein hardware checking of virtual memory blocks, which may be scattered within addressable physical memory space, is provided. A hardware-based RTIC solution allows checking on a per-page basis, rather than only on a large contiguous block of memory. Such a system and method may utilize access control features of secure memory to allow more flexible configurations of RTIC. A hardware-based RTIC system and method can check program data scattered throughout physical memory address space and can temporarily stop checking data that has been swapped out of physical memory, as may occur, for example, in a virtual memory system. A hardware-based RTIC system and method may provide provenance of its authenticity (e.g., that it has not been tampered with) by providing traceability along a chain of trust back to an immutable feature implemented in hardware (e.g., logic, a finite state machine (FSM), instruction code stored in read-only memory (ROM), or the like, which software instruction code executed on a processor of the system is unable to modify or disable).

Reference hash values are used both for secure loading of the software image and for RTIC of the software image. Secure loading of the software image uses a single reference hash value across the entire software image, while RTIC uses reference hash values for each individual memory page of the software image. Typically, one pass through the entire software image is made to generate its reference hash value. Another pass through all of the data is made to generate reference hash values for each memory page. Taking two passes through the software image to generate both the secure loading reference hash value, and also the reference hash value for each individual page takes time. It would be preferred to generate all of the reference hash values in a single pass through the software image. In accordance with at least one embodiment, single-pass hashing of data may be implemented for use in a secure boot technique and in virtualized RTIC. A method provides, in a single pass over the checked entity, generation of hash values for each block of data (e.g., each 4K byte page) and combination of those results to generate a single hash over the entire application program. One way in which such a method may be implemented utilizes hash value chaining. Hash each data block to generate individual hash values. The hash of the first block is concatenated with the second block before hashing. The hash of each block is concatenated with the next block of data to generate the new hash. The hashing is chained, so that the final hash is the hash for the entire block of data and may be used for secure boot validation of the boot software image. Each individual hash is the reference hash for individual memory pages. When performing run-time integrity checking the reference hash value of the previous entry is required even if the data is not present, as the hash value is of the previous entry is used to calculate the succeeding entry.

As an example, secure boot may utilize a hash H, wherein hash H=hash (A)—where A is the entire application data, and virtualized RTIC may utilize a plurality of hashes H1 through Hn, wherein hash H1=hash (A1), H2=hash (A2), . . . , Hn=hash (An), where A=A1∥A2∥ . . . ∥An (i.e., concatenation of all blocks over which the hash is calculated). All of the data is hashed twice, once to generate a secure boot reference hash value, and a second time to generate the individual memory page reference hash values. To provide single-pass hashing for secure boot and virtualized RTIC, let H1=hash (A1), H2=hash (H1∥A2), . . . , Hn=hash (Hn−1∥An). Such a hash calculation method provides n different hash values that can be used for run-time integrity checking and a single hash (Hn) that covers all of the data. Each run-time integrity check utilizes two entries, entry n and entry n−1, so the hash located in entry n−1 may be concatenated with the data of block n prior to hashing. The reference hash value An is used both for secure boot validation of the boot software image and as the reference hash for the last memory page.

In accordance with at least one embodiment, a different approach is as follows: Hash each data block to generate individual hash values. The individual hashes are concatenated and hashed again. The individual hash values are used by the RTIC method, and the hash of the hashes is used for secure boot. Thus, hash values computed (or pre-computed) for secure boot may be used for run time integrity checking. A single pass through the software image is used to generate the reference hash values for the individual memory pages, while a second pass is used to hash the hashes. This second pass is much quicker than a second pass through the entire software image.

As an example, calculate the following hash values: H1=hash (A1), H2=hash (A2), . . . , Hn=hash (An), then calculate a hash H, wherein hash H=hash (H1∥H2∥ . . . ∥Hn). Hash H still covers all of the data, while the individual hashes cover the separate blocks of data, thereby providing single-pass hashing that may be used, for example, with a secure boot technique and with an RTIC system that supports virtual memory.

In accordance with at least one embodiment, pre-computed hash values are used for initializing RTIC entries. Thus, it is possible for an RTIC system to use the pre-computed hash values rather than compute its own hash values, for example, on its first pass. The pre-computed values may be computed along with a hash value of a checked entity (e.g., an application program), which may be used, for example, with secure boot.

In accordance to at least one embodiment, only a single pass through the data is used to compute the reference hash value for the entire software image for use in secure boot or secure loading of the software image. The RTIC system generates the reference hash values for each individual memory page on its first pass. On succeeding passes through the memory pages, RTIC will compare the reference hash value calculated for a memory page during the first pass with the generated hash value calculated for the memory page on the succeeding pass to verify that the contents of the memory page have not changed.

Some computer architectures provide different levels of trust for processor instruction code being executed. For example, application software that has been designated as trusted may be able to access a peripheral that is not otherwise accessible (e.g., is not accessible to non-trusted application software).

To establish trustworthiness of processor instruction code in an information processing system, a secure boot process may be used to make sure the information processing system is executing intended processor instruction code. Such a secure boot process may be used signed processor instruction code. As an example, a public key cryptosystem (PKC) may be used to provide a digital signature for a boot image, allowing the boot image, which comprises processor instruction code used to boot up the information processing system, to be cryptographically authenticated. A processor's instruction code for performing the authentication of the boot image may be stored, for example, in a fixed, immutable form, such as in an internal read-only memory (ROM), which cannot be altered, thereby assuring the authenticity of the instruction code for performing the authentication of other instruction code that may be stored in a less immutable medium. After booting correctly, an OS can be trusted to then authenticate application programs before loading and running them. A secure application loader may be used by an operating system to verify that only trusted application code is allowed to run. A public key cryptosystem may be used to provide a digital signature for an application program, allowing the application program to be authenticated. A chain of trust can be created from booting from immutable ROM code to the running of an authenticated application program that only trusted software is allowed to run. Such a chain of trust makes a hardware-based secure boot system, a hardware-based RTIC system, or the like more trustworthy than software-only security systems.

While a secure boot process may provide verification when an information processing system initially begins operation, it may be unable to provide any assurance that the information processing system continues to operate correctly. The secure boot process may be unable to detect memory corruption due to a memory failure or to a malicious attack on the information processing system that may occur some time after the secure boot process is completed. Ongoing protection may be provided by a run-time integrity checking (RTIC) system that is capable of checking the integrity of processor instruction code even after execution of that processor instruction code has begun within the information processing system. The RTIC system may, for example, lock away in a hardware register a boot hash value used to verify processor instruction code at boot time. Then, the RTIC system may periodically calculate a hash value based on the current state of the processor instruction code being verified and compare that hash value to the reference boot hash value to identify any changes in the processor instruction code since boot time.

However, sometimes the information being verified isn't necessarily supposed to stay the same as it was at boot time. For example, data used by or generated by processor instruction code may change during the execution of the processor instruction code even if the processor instruction code itself doesn't change over time. This continually changing data may be unable to be checked by run-time integrity checking, as RTIC requires a comparison of the current data with the data at the start of operation. As another example, in a virtual memory (VM) system, processor instruction code is stored in pages which may be swapped into and out of memory over time. Such pages may be moved around in memory and may not always be in physical memory. When such pages are resident in physical memory, they have the same contents as when they were first loaded either during secure boot or secure application loading. With a reference hash value for each individual memory page, the memory pages can be integrity checked at run-time regardless of where in physical memory they currently reside. When such pages are not resident in physical memory, RTIC will not perform checking on those memory pages, and will, in one embodiment, have the enable indicator in the corresponding table entry set to zero.

Processor instruction code pages used by a process may be removed from physical memory if the process is terminated. In this case, RTIC stops checking the memory, and, in one embodiment, have the in-use indicator set to zero. If an operating system has caused RTIC to start checking an application program code image, the operating system is provided with the ability to stop RTIC from further checking of the application program code image after the application program is terminated. The application program is not allowed to stop RTIC from further checking of itself during its continued operation. If a hypervisor has caused RTIC to start checking an operating system code image, the hypervisor is provided with the ability to stop RTIC from further checking of the operating system after the hypervisor has terminated the operating system. The operating system is not allowed to stop RTIC from checking itself as long as the operating system continues running. The operating system is not allowed to have access to the RTIC page entries that refer to the memory pages occupied by the operating system code. The operating system is allowed to have access to the RTIC page entries that refer to the memory pages occupied by an application program controlled by the operating system. Thus, higher level software may have access to RTIC page entries of lower level software under control of the higher level software and may control the starting and stopping of RTIC checking the lower level software. However no software entity should be allowed access to RTIC page entries that refer to itself.

In accordance with at least one embodiment, memory is organized into memory blocks, for example, pages, of, for example, four kilobytes each. Hardware is provided to maintain a list of pages with assigned reference hash values. As long as a page is resident in memory, its hash value may be calculated and compared to its original hash value (for example, at boot time, or, as another example, at the beginning of execution of instruction code to perform a process). Hardware is provided to maintain a table of pointers to pages in memory, hash values of the pages, and flags (e.g., binary values) corresponding to the pages. The flags may, for example, comprise a hash valid bit to indicate whether or not the RTIC system has performed a hash calculation on the page before and, as another example, a resident bit to indicate whether the page is currently resident in memory or has been swapped out.

In accordance with at least one embodiment, the tables are located so as to prevent unauthorized access to them. For example, a hardware mechanism may be provided to lock out write access to the tables so that the original contents of the tables may not be altered. Such a hardware mechanism may be implemented entirely in hardware, such as using logic circuitry to provide a finite state machine or may be implemented using a secure instruction-based implementation, such as protected firmware. There may be a large amount of data in a table, so the table should be checked using a level of processing abstraction that cannot change the data. As an example, a trust supervisor built into a processor may be used to check an operating system, the instruction code of which is being executed by the processor.

As another example, an operating system may execute instruction code to check the instruction code of the operating system or another operating system. As yet another example, the operating system may execute instruction code to check instruction code of application software to be executed under the operating system.

Secure memory may be implemented, for example, as random-access memory (RAM) that software can initially read and write but that a supervisory agent, such as an operating system (OS) can lock down (i.e., inhibit all access or at least write access) after the period of initial accessibility. As an example applicable to a case where, for example, an OS performs an integrity check on application software running under the OS, there can be a much larger table if the table is implemented in internal memory or even in external RAM that is protected by the OS to prevent the application software from being able to access it.

In accordance with at least one embodiment, the table may be implemented separately from a memory management unit (MMU) page table used to manage paging of virtual memory. In accordance with at least one embodiment, the table may be combined with a MMU page table used to manage paging of virtual memory. As can be seen from the examples of FIGS. 2 and 3, a residency indicator to indicate whether or not a virtual memory page is resident in physical memory may be used as an enable indicator, such as that shown under enable columns 307 and 313 of FIG. 3. As an example, an MMU page table may contain entries for memory containing a variety of types of information, which may include, for example, hypervisor instruction code, hypervisor data, operating system instruction code, operating system data, application software instruction code, application software data, and the like. Some types of data (e.g., hypervisor data, operating system data, application software data, and the like) may be static data that remains constant over time, while other types of such data may be changing data which may change over time during normal operation without a need for detection of such changes. An enable indicator to indicate enablement of RTIC for a memory page in a MMU page table may set by a software entity performing checking to a disabled state for a page table entry corresponding to a memory page of a software entity being checked where the software entity being checked stores changing data to prevent false error (e.g., undesired mismatch) indications from the RTIC system. Such setting of an enable indicator to a disabled state may be used with or without a virtual memory system to provide fine-granularity (e.g., memory-page-by-memory-page) selective enablement and disablement of RTIC operations. Thus, for example, an enable indicator may remain enabled for memory pages storing non-changing instruction code or static data if such non-changing instruction code or static data is not within memory used as virtual memory; and enable indicator may be changed back and forth between enabled and disabled states for memory pages storing non-changing instruction code or static data as such memory pages are swapped out of and back into physical memory under control of a virtual memory system; and an enable indicator may remain disabled for memory pages storing changing data. Such enable indicators may be implemented separately from residency indicators of the MMU page table entries, which may indicate if a virtual memory page is resident in physical memory, allowing RTIC of memory pages storing changing data to remain disabled as such memory pages may be swapped out of and back into physical memory under control of a virtual memory system.

Information is provided to the RTIC system to inform the RTIC system of where the table of entries resides, how many entries are in the table, how many entries are valid, how often to check memory, whether the RTIC system should stop (e.g., whether software should be able to cause the RTIC system to stop) or run indefinitely (e.g., until the next hardware reset), and whether integrity checking is currently being performed.

In accordance with at least one embodiment, the RTIC system may be selectively enabled and disabled with a granularity at least as fine as at a page level. Thus, for example, the RTIC system may be selectively turned off for at least one memory page. As an example, if an operating system moves pages around in memory, that operating system informs the RTIC system not to check while the operating system is changing the memory contents, which may be performed, for example, by modifying enable bits for the relevant pages to disable the RTIC system with respect to those pages, then moving the pages, then re-enabling enable bits for the relevant pages to re-enable the RTIC system with respect to those pages.

In accordance with at least one embodiment, the RTIC system, having information as to the location of the table in memory, will check the enable bit for a page, follow a pointer to the page, read the page, calculate a hash value for the page, check the valid bit for that page in the table, then, if the hash valid bit shows a stored reference hash value for the table entry for the page to be valid, compare the calculated hash value with the stored reference hash value retrieved from the table or, if the hash valid bit shows the reference hash value for the table entry for the page not to be valid, store the calculated value in the table to be used as the stored reference hash value for future comparison. The RTIC system may be put to sleep and later awakened. The RTIC system may continue to the next entry in the table and may wrap around to the beginning of the table after reaching the end of the table, or continue with checking the next table.

As an example, an operating system may alter enable bits, for example, enabling an enable bit for a page when that page is resident in memory and disabling the enable bit for the page when that page has been swapped out of memory in a virtual memory system. The altering of the enable bits by the operating system should be coordinated with the operation of the RTIC system so as to give the RTIC system enough time in case the RTIC system is currently checking a page corresponding to an enable bit being changed. As an example, the altering of an enable bit corresponding to a page currently being checked by the RTIC system may be inhibited or delayed until completion of the checking of that page. As another example, the RTIC system may abort checking of a memory page if the enable bit for the memory page has been cleared, indicating that the memory page is no longer resident at the current location.

As an example, an operating system may clear enable and hash valid bits when an application is initialized and clear the enable bits when the application is terminated. Otherwise, the RTIC system may control the hash valid bits.

In accordance with at least one embodiment, at secure boot time, reference hash values are obtained for individual pages of memory (e.g., for each 4 Kbyte page). Then, a hash value (i.e., a hash of hashes) is calculated from those individual page reference hash values. In accordance with at least one embodiment, an application loader may calculate hash values for pages of memory occupied by an application as the application loader loads the application, thereby avoiding re-reading the same pages to calculate hash values for them after they have already been read to be loaded and also avoiding latency before such re-reading can occur, avoiding temporal gaps during which alteration of the pages might otherwise go unnoticed. The RTIC system is configured to work with the application loader, for example, using a compatible hash value determination technique, such as a parallel or serial approach to hash value determination.

In accordance with at least one embodiment, a method for run-time integrity checking (RTIC) of memory comprises storing a table of page entries, wherein a page entry of the page entries corresponds to a memory page of a plurality of memory pages into which the memory is organized, wherein the page entry comprises a reference hash value for the page and a hash valid indicator indicating the validity status of the reference hash value and accessing the table of page entries by a run-time integrity checking system to perform the RTIC of the memory referenced by the table of page entries. In accordance with at least one embodiment, the table is stored in secure memory. In accordance with at least one embodiment, the table is stored in external memory. In accordance with at least one embodiment, the page entry further comprises a residency indicator indicating a residency status of the memory page. In accordance with at least one embodiment, the method further comprises inhibiting writing a hash value to the page entry of the table in response to the hash valid indicator indicating that the reference hash value in the page entry is valid. In accordance with at least one embodiment, the method further comprises calculating an overall hash value from a plurality of memory page hash values corresponding to the plurality of memory pages. In accordance with at least one embodiment, the method further comprises calculating a chained overall hash value progressively dependent on preceding memory page hash values corresponding to preceding ones of the plurality of memory pages. In accordance with at least one embodiment, the memory referenced by the table of the page entries stores instruction code for an operating system.

In accordance with at least one embodiment, a method for run-time integrity checking (RTIC) of memory comprises storing a table of page entries, wherein a page entry of the page entries corresponds to a memory page of a plurality of memory pages into which the memory is organized, wherein the page entry comprises a reference hash value for the page and a hash valid indicator indicating the validity of the reference hash value and accessing the table of page entries by a run-time integrity checking system to perform the RTIC of the memory in which an operating system running under a hypervisor is stored. In accordance with at least one embodiment, the table is stored in secure memory. In accordance with at least one embodiment, the table is stored in external memory. In accordance with at least one embodiment, the page entry further comprises a residency indicator indicating a residency status of the memory page. In accordance with at least one embodiment, the method further comprises inhibiting writing a hash value to the page entry of the table in response to the hash valid indicator indicating that the reference hash value in the page entry is valid. In accordance with at least one embodiment, the method further comprises calculating an overall hash value from a plurality of memory page hash values corresponding to the plurality of memory pages. In accordance with at least one embodiment, the method further comprises calculating a chained overall hash value progressively dependent on preceding memory page hash values corresponding to preceding ones of the plurality of memory pages.

In accordance with at least one embodiment, a method for run-time integrity checking (RTIC) of memory comprises storing a table of page entries by a hypervisor, wherein a page entry of the page entries corresponds to a memory page of a plurality of memory pages into which the memory is organized, wherein the page entry comprises a reference hash value for the page and a hash valid indicator indicating the validity of the reference hash value, and accessing the table of page entries by a run-time integrity checking system to perform the RTIC of the memory in which the hypervisor is stored. In accordance with at least one embodiment, the table is stored in secure memory. In accordance with at least one embodiment, the page entry further comprises a residency indicator indicating a residency status of the memory page. In accordance with at least one embodiment, the method further comprises inhibiting writing a hash value to the page entry of the table in response to the hash valid indicator indicating that the reference hash value in the page entry is valid. In accordance with at least one embodiment, the method further comprises calculating an overall hash value from a plurality of memory page hash values corresponding to the plurality of memory pages. In accordance with at least one embodiment, the method further comprises calculating a chained overall hash value progressively dependent on preceding memory page hash values corresponding to preceding ones of the plurality of memory pages.

In accordance with at least one embodiment, a method for run-time integrity checking (RTIC) of memory comprises storing a table of page entries, wherein a page entry of the page entries corresponds to a memory page of a plurality of memory pages into which the memory is organized, wherein the page entry comprises a reference hash value for the page and a hash valid indicator indicating the validity status of the reference hash value, accessing the page entry, in response to the accessing the page entry, performing the run-time integrity checking of the memory page, beginning execution of a software entity comprising information stored in the memory page, and performing a second instance of the run-time integrity checking of the memory page after the execution of the software entity has begun. In accordance with at least one embodiment, performing the second instance of the run-time integrity checking is performed while the information remains stored in the memory page. In accordance with at least one embodiment, performing the second instance of the run-time integrity checking is performed before execution of the software entity ends. In accordance with at least one embodiment, the table is stored in secure memory. In accordance with at least one embodiment, the table is stored in external memory. In accordance with at least one embodiment, the page entry further comprises a residency indicator indicating a residency status of the memory page. In accordance with at least one embodiment, the method further comprises inhibiting writing a hash value to the page entry of the table in response to the hash valid indicator indicating that the reference hash value in the page entry is valid. In accordance with at least one embodiment, the method further comprises writing the hash value to the page entry of the table in response to the hash valid indicator indicating that the reference hash value in the page entry is not valid. In accordance with at least one embodiment, the method further comprises calculating an overall hash value from a plurality of memory page hash values corresponding to the plurality of memory pages. In accordance with at least one embodiment, the method further comprises calculating a chained overall hash value progressively dependent on preceding memory page hash values corresponding to preceding ones of the plurality of memory pages.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method for run-time integrity checking (RTIC) of a virtual memory system comprising:
    calculating a chained overall hash value dependent on preceding memory page hash values corresponding to preceding ones of a plurality of memory pages, the chained overall hash value being chained such that a first preceding memory page hash value corresponding to a first preceding one of the plurality of memory pages is concatenated with a second preceding one of the plurality of memory pages and a second preceding memory page hash value is calculated, with concatenation and hash generation continuing for each block to yield the chained overall hash value;
    storing a table of page entries, wherein a page entry of the page entries corresponds to a memory page of the plurality of memory pages into which the virtual memory system is organized, wherein the page entry comprises a reference hash value for the page and a hash valid indicator indicating the validity status of the reference hash value; and
    accessing the table of page entries by a run-time integrity checking system to perform the RTIC of the memory page referenced by the table of the page entries when the memory page is present in physical memory; and
    inhibiting the RTIC of the memory page in response to the memory page being swapped out of the physical memory into storage.

2. The method of claim 1 wherein the table is stored in secure memory.

3. The method of claim 1 wherein the table is stored in external memory.

4. The method of claim 1 wherein the page entry further comprises:
    a residency indicator indicating a residency status of the memory page.

5. The method of claim 1 further comprising:
    inhibiting writing a hash value to the page entry of the table in response to the hash valid indicator indicating that the reference hash value in the page entry is valid.

6. The method of claim 1 further comprising:
    calculating an overall hash value from a plurality of memory page hash values corresponding to the plurality of memory pages.

7. The method of claim 1 wherein the memory referenced by the table of the page entries stores instruction code for an operating system.

8. A method for run-time integrity checking (RTIC) of a virtual memory system comprising:
    calculating a chained overall hash value dependent on preceding memory page hash values corresponding to preceding ones of a plurality of memory pages, the chained overall hash value being chained such that a first preceding memory page hash value corresponding to a first preceding one of the plurality of memory pages is concatenated with a second preceding one of the plurality of memory pages and a second preceding memory page hash value is calculated, with concatenation and hash generation continuing for each block to yield the chained overall hash value;
    storing a table of page entries by a hypervisor, wherein a page entry of the page entries corresponds to a memory page of the plurality of memory pages into which the virtual memory system is organized, wherein the page entry comprises a reference hash value for the page and a hash valid indicator indicating the validity of the reference hash value; and
    accessing the table of page entries by a run-time integrity checking system to perform the RTIC of the memory page in which the hypervisor is stored.

9. The method of claim 8 wherein the page entry further comprises:
    a residency indicator indicating a residency status of the memory page.

10. A method for run-time integrity checking (RTIC) of virtual memory system comprising:
    calculating a chained overall hash value dependent on preceding memory page hash values corresponding to preceding ones of a plurality of memory pages, the chained overall hash value being chained such that a first preceding memory page hash value corresponding to a first preceding one of the plurality of memory pages is concatenated with a second preceding one of the plurality of memory pages and a second preceding memory page hash value is calculated, with concatenation and hash generation continuing for each block to yield the chained overall hash value;
    storing a table of page entries, wherein a page entry of the page entries corresponds to a memory page of the plurality of memory pages into which the virtual memory system is organized, wherein the page entry comprises a reference hash value for the page and a hash valid indicator indicating the validity status of the reference hash value;
    accessing the page entry;
    in response to the accessing the page entry, performing the run-time integrity checking of the memory page;
    beginning execution of a software entity comprising information stored in the memory page;
    performing a second instance of the run-time integrity checking of the memory page after the execution of the software entity has begun; and inhibiting the run-time integrity checking of the memory page in response to the memory page being swapped out of physical memory into storage.

11. The method of claim 10 wherein performing the second instance of the run-time integrity checking is performed while the information remains stored in the memory page.

12. The method of claim 10 wherein performing the second instance of the run-time integrity checking is performed before execution of the software entity ends.

13. The method of claim 10 wherein the table is stored in secure memory.

14. The method of claim 10 wherein the table is stored in external memory.

15. The method of claim 10 wherein the page entry further comprises:
   a residency indicator indicating a residency status of the memory page.

16. The method of claim 10 further comprising:
   inhibiting writing a hash value to the page entry of the table in response to the hash valid indicator indicating that the reference hash value in the page entry is valid.

17. The method of claim 10 further comprising:
   writing the hash value to the page entry of the table in response to the hash valid indicator indicating that the reference hash value in the page entry is not valid.

18. The method of claim 10 further comprising:
   calculating an overall hash value from a plurality of memory page hash values corresponding to the plurality of memory pages.

* * * * *